3,256,075
ABRASIVE SPONGE
Robert Myron Kirk, Prairie du Chien, Wis., George W. Overton, Freeport, Ill., and Charles H. Specht and Richard Glenn Kaufman, Prairie du Chien, Wis., assignors, by mesne assignments, to Minnesota Mining and Manufacturing Company, St. Paul, Minn., a corporation of Delaware
No Drawing. Filed Oct. 20, 1961, Ser. No. 146,428
12 Claims. (Cl. 51—295)

This invention relates to synthetic sponges, and more particularly refers to a synthetic sponge having abrasive material incorporated therein.

Cellulose sponges are traditionally manufactured by first preparing a mixture of viscose, fibers such as hemp, cotton or flax, and Glauber's salt. The mixture is then placed into molds and heated to coagulate and/or regenerate the cellulose. The molded and regenerated mass is then washed to remove the Glauber's salt, bleached, rewashed, and subsequently dried. Before drying, the sponge may be treated with a solution containing a humectant, such as glycerin.

Sponges prepared as described have excellent water absorption properties. However, when wet, cellulose sponge is extremely soft and pliable and is therefore not efficient for scrubbing or scouring surfaces. When ordinary abrasives are added, the sponge material has a tendency to tear when subjected to the ordinary stresses of scouring over a period of time.

It is an object of the invention to provide a cellulose sponge having good abrasive properties.

It is a further object to provide such a sponge whose abrasive properties will not be impaired by repeated subjecting to hot water and wearing away of the surfaces of the sponge.

It is still further an object to provide a sponge which, though having abrasive material incorporated therein, yet has high resistance to tearing, and is sufficiently flexible for ordinary cleansing purposes.

In accordance with the invention it has been found that cellulose sponge having excellent abrasive properties as well as good coherance may be provided by first shredding or granulating scrap sponge to produce small particles. The shredded sponge is then coated or impregnated with a resinous material and treated to harden the resin. The coated sponge particles are then mixed into a mixture or dispersion of viscose and Glauber's salt traditionally used for making cellulose sponge. After the viscose is regenerated and the Glauber's salt removed, cellulose sponge is produced having excellent abrasive properties and good coherence under stringent use.

It has been further found that even better coherence and better bonding may be obtained if the impregnated shredded sponge particles are further sub-divided into even finer particles in order to expose untreated surfaces. The further treated scrap sponge particles are then mixed with the unregenerated dispersion of viscose and Glauber's salt, and the sponge regenerated in the usual manner.

Instead of scrap sponge, various fibers may be treated with resin in the same manner. When the resin has been hardened, the treated fibers are dispersed into an unregenerated sponge mixture. When regenerated, the sponge so prepared is suitable for many purposes, although the resistance to tearing of the sponge is not as good as when treated sponge scrap is used.

Among the materials which may be used are natural or vegetable fibers including sisal, tampico, bahia, bassine, cocoa fibers, ramie, loofa, excelsior, wood slivers, sawdust, and peanut shells. Synthetic fibers such as saran, nylon, Dacron, and others are suitable.

Other material such as rubber cut into narrow strips, polyethylene strips, acrylic resin strips, and ground walnut shell are also suitable.

In preparing abrasive sponge material according to the invention, the shredded sponge or fibers are first stiffened to increase their abrasiveness by coating them with a resinous material in liquid form, and subsequently hardening the resinous material. Among the resins which may be used are thermosetting resins such as phenol-formaldehyde, melamine-formaldehyde, or urea-formaldehyde. Other thermosetting resins such as polyester or epoxy resins may be used.

Thermoplastic resins such as cellulose acetate, cellulose acetate-butyrate, ethyl cellulose, vinyl and vinylidene polymers and copolymers, polyvinyl alcohol containing thermosetting resins, polyamide resins in combination with epoxy resins, acrylate and methacrylate resins, polystyrene, and others may be used. Various elastomeric materials may also be used such as rubber, GRS, as well as various synthetic latices, such as acrylonitrile and styrene-butadiene emulsions.

In treating the fibers they may be either immersed in a solution or sprayed with the resin in liquid form. In the case of thermosetting resins, uncured resins in the liquid form may be used, as well as in solution. In the case of thermoplastic materials, they may be applied either in the molten form or in solvent or plastisol form. After application, the resins are handened by appropriate means.

The treated scrap sponge and fibers may also be incorporated in sponge materials other than cellulose sponge. Among the more common sponge materials which are suitable are polyvinyl chloride, polyurethane and other elastomeric sponge materials. These sponges are formed by methods well known in the art. The scrap sponge should preferably be of the same material as the sponge body in order to provide better adhesion. However, where compatible, diverse types of sponges may be used, the treated scrap sponge or fibers may be incorporated either before or during the "blowing" or "expanding" operation.

*Example 1*

Shredded cellulose sponge particles having a length of from one-fourth to three-fourths inch and a cross section of from $\frac{1}{8}$ to $\frac{3}{8}$ inch were soaked in a solution containing 250 grams per liter of Aerotex Resin M–3, a water-soluble methylated melamine formaldehyde resin syrup containing 80% active ingredients and having a pH of 8.5–9, 5.6 grams per liter of Accelerator AS, a water-soluble ammonium salt which has a specific gravity of 1.8 and which yields a pH of 5.8 in 10% aqueous solution, believed to be ammonium acid sulfate and 4.8 grams per liter of Buffer DCY, dicyandiamide. The sponge particles were then pressed out to remove the excess solution until their weight was about four times the original dry weight. They were dried at 105 degrees C. One hundred grams of the dried shredded sponge were then mixed with sufficient viscose, flax fibers, and Glauber's salt (4 to 8 mesh) to form a 20 pound uniform sponge composition or mix. The mass was poured into molds, regenerated by heat, washed in water to remove the Glauber's salt, bleached, rewashed, treated with emollient, and dried, in the usual manner. The sponge loaf was then cut up to form small sponges having excellent abrasive properties.

*Example 2*

Shredded sponge scrap particles of about $\frac{1}{4}$ to $\frac{1}{2}$ mesh were sprayed with the solution of 10% cellulose acetate in acetone, and dried. The sponge particles were found to contain approximately 20% of cellulose acetate based on the weight of the shredded sponge.

One hundred grams of the treated sponge was uniformly mixed into ten pounds of sponge mix slurry. The mass was then formed into molds, and regenerated with heat, washed, and treated in a manner similar to that described above. A good abrasive sponge resulted.

Example 3

Scrap cellulose sponge was shredded by hammermilling through a ¾ inch screen. The shredded particles were then coated or impregnated by immersing in a solution of Geon Resin No. 400X110, a vinyl chloride polymer having an average specific viscosity of .24 at 30° C. in .4% solution in nitrobenzene in the proportions of one part sponge and two parts polymer. The treated particles were then dried by heat. They were then further subjected to shredding in order to expose untreated sponge surfaces.

The treated and reshredded sponge particles in an amount of 0.15 lb. were then added to a sponge mix comprised of 5 lbs. viscose and 0.15 lb. flax. The composition was mixed in a sigma blade type mixer until the sponge particles and flax were uniformly distributed throughout the viscose. A charge of 15 lbs. of sodium decahydrate crystals, of such size as to pass entirely through a ¼ inch mesh screen with about 30% passing through a ten mesh screen, were added and mixing continued until the mix was uniform in consistency. The mix was then transferred to molds and subjected to a temperature of approximately 200° F. for about twenty-four hours until the sponges had been uniformly regenerated throughout. They were then washed free of salt and treated with dilute acid and bleaching solution for further purification. A softening agent comprised of glycerin was added in order to soften the finished product.

The finished sponges had excellent abrasive properties and much better adhesion of the abrasive material to the sponge body than the sponges produced above in Examples 1 and 2.

Example 4

Cellulose sponge in an amount of 85 g. was hammer-milled through a ¾ inch screen, and subsequently impregnated with a solution containing 250 g. of Geon 400X110 dissolved in 500 g. of acetone. The impregnated sponge particles were dried to remove the acetone, and subsequently further ground to particles of ⅛ inch size. The treated sponge particles were added to a standard regenerable sponge mix as described above, and the sponge subsequently regenerated, washed, and dried.

Example 5

Cellulose sponge having a weight of 75 g. was ground to ¾ inch screen size as above and impregnated with a solution having the following composition:

| | G. |
|---|---|
| Vinylite XYSG polyvinyl butyral containing 7% free hydroxyl and having an intrinsic viscosity of 0.81 in cyclohexane at 20° C. | 182 |
| Acetone | 356 |
| Isopropanol | 486 |
| Water | 49 |

After drying, the material was further ground to ⅛ inch size and incorporated into a standard sponge mix, and processed as above.

Example 6

Eighty-five grams of ground sponge prepared as above were impregnated with 500 g. Pliovic Latex 300 (a 50% solids latex of a 90:10 copolymer of vinyl chloride and another monomer, believed to be ethyl maleate). The impregnated sponge was ground to ⅛ inch after drying twenty hours at 105° C., incorporated in a sponge mix, and the mix subsequently regenerated as described above.

Example 7

Eighty-five grams of ground cellulose sponge scrap was impregnated with 204 g. Araldite 502, a medium viscosity liquid modified epoxy resin having an epoxy value of 232–250 grams per oxirane ring gram equivalent weight, and 20 g. Araldite HN–951, a cross-linking amine hardener, believed to be diethylenetriamine. The resin coating was cured for twenty-four hours at 104° F. and the sponge then ground to ⅛ inch size particles. The particles were incorporated into a standard cellulose sponge mix as above, and the mix regenerated in the usual manner.

Example 8

Tampico fibers of approximately one inch in length were treated by spraying with a solution of Lyofix PR (150 grams/liter), a concentrated solution of a modified urea-formaldehyde resin, to which 7% catalyst No. 192 (zinc nitrate), based on the weight of Lyofix PR, was added. The treated fibers were heated at a temperature of 300° F. for approximately five minutes in order to dry cure the resin.

A sponge mix slurry was prepared comprising viscose, hemp fibers, and Glauber's salt crystals (4 to 8 mesh). One hundred grams of the fibers treated as described above were added to 10 pounds of the sponge mixture. After the mixture slurry has been mixed to incorporate the fibers uniformly, it was poured into molds. The slurry was then heated to regenerate the cellulose, and washed with water to remove the Glauber's salt. The regenerated cellulose sponge was bleached, and rewashed. A solution containing a small amount of glycerin as a humectant was added and the sponge subsequently dried.

Inorganic abrasive particles such as carborundum, emery, or others may be added to the sponge mass prior to regeneration in addition to the treated sponge scrap, if greater abrasive properties are desired for such purposes as for scrubbing pots and pans. Abrasive particles may also be added to the resin used to coat the sponge scrap, and this method will result in a product in which the abrasive particles are more firmly retained.

The abrasive sponges of the invention have many advantages, especially those produced by incorporating treated scrap sponge. They are inexpensive to produce, provide mild abrasive properties which are excellent for such uses as cleaning windows and other surfaces where a more drastic abrasive might provide injurious results. The sponges have excellent coherence, especially when the treated sponge particles are subsequently additionally shredded to expose untreated sponge surfaces. The sponges are easy and inexpensive to produce and may be produced in existing equipment generally available to sponge manufacturers.

Although the invention has been described in only relatively few embodiments, other variations may be practiced by those skilled in the art without departing from the spirit and scope of the invention as defined in the appended claims.

Invention is claimed as follows:

1. A flexible mildly abrasive water-absorptive cleaning device comprising a regenerated cellulose sponge having, dispersed throughout and firmly embedded within, a minor part of small hard preformed organic particles, said particles comprising relatively soft flexible cellulosic material at least partially coated with a relatively harder water-resistant synthetic polymer prior to dispersion within said sponge, said polymer rendering said particles harder, stiffer, and more abrasive.

2. A flexible mildly abrasive water-absorptive cleaning device comprising a regenerated cellulose sponge having, dispersed throughout and firmly embedded within, a minor amount of small hard preformed organic particles, said particles comprising sponge material at least partially coated with a relatively harder water-resistant synthetic polymer prior to dispersion within said sponge, said polymer rendering said particles harder, stiffer, and more abrasive.

3. A flexible mildly abrasive water-absorptive cleaning device comprising a regenerated cellulose sponge having, dispersed throughout and firmly embedded within, a minor amount of small hard preformed organic particles, said particles comprising cellulosic sponge material at least partially coated with a relatively harder water-resistant synthetic polymer prior to dispersion within said sponge, said polymer rendering said particles harder, stiffer, and more abrasive.

4. A cellulose sponge according to claim 3 wherein said polymer is a polyvinyl butyral resin.

5. A cellulose sponge according to claim 3 wherein said polymer is a melamine-formaldehyde resin.

6. A cellulose sponge according to claim 3 wherein said polymer is an epoxy resin.

7. A cellulose sponge having uniformly dispersed therein a plurality of fibers, said fibers having a hardened coating of a resinous material applied to the surfaces of said particles prior to their dispersion within said sponge.

8. A flexible mildly abrasive water-absorptive cleaning device comprising a regenerated cellulose sponge having, dispersed throughout and firmly embedded within, a minor amount of small hard preformed organic particles, said particles comprising cellulosic material at least partially coated with a relatively harder water-resistant synthetic polymer prior to dispersion within said sponge, said polymer containing inorganic abrasive granules and rendering said particles harder, stiffer, and more abrasive.

9. A flexible mildly abrasive water-absorptive cleaning device comprising a regenerated cellulose sponge having, dispersed throughout and firmly embedded within, a minor amount of inorganic abrasive granules and small hard preformed organic particles, said particles comprising sponge material at least partially coated with a relatively harder water-resistant synthetic polymer prior to dispersion within said sponge, said polymer rendering said particles harder, stiffer, and more abrasive.

10. A method for the production of a cellulose sponge having abrasive properties which comprises granulating a preformed cellulose sponge, coating the resulting particles with a hardenable synthetic resinous material and causing said material to harden, uniformly dispersing said coated particles in an unregenerated viscose sponge composition, and processing said composition to form regenerated cellulose sponge.

11. A method for the production of cellulose sponge having abrasive properties which comprises granulating a preformed cellulose sponge to produce a plurality of sponge particles, coating said particles with a hardenable synthetic resinous material and hardening said resinous material, further granulating said coated sponge particles to expose a portion of uncoated sponge surfaces, uniformly dispersing said sponge particles in an unregenerated viscose sponge composition, and processing said sponge composition to produce regenerated sponge containing said preformed coated sponge particles.

12. A method for the production of cellulose sponge having abrasive properties which comprises coating a plurality of fibers with a resinous material and hardening said resinous material, uniformly dispersing said coated fibers in an unregenerated viscose sponge composition, and regenerating said composition to form cellulose sponge containing said coated fibers uniformly dispersed therein.

References Cited by the Examiner

UNITED STATES PATENTS

| | | | |
|---|---|---|---|
| 2,268,403 | 12/1941 | Kingman | 51—303 |
| 2,624,988 | 2/1950 | Wal | 51—299 |
| 2,668,153 | 2/1954 | Hammon | 51—298 |
| 2,780,533 | 2/1957 | Hurst | 51—298 |
| 2,977,330 | 3/1961 | Brower | 51—298 |
| 3,016,294 | 1/1962 | Haywood | 51—297 |

ALEXANDER H. BRODMERKEL, *Primary Examiner.*

JOHN R. SPECK, MORRIS LIEBMAN, *Examiners.*

D. J. ARNOLD, *Assistant Examiner.*